Aug. 4, 1964

B. R. EVERETT 3,143,018

TUBE CUTTING APPARATUS

Filed Feb. 20, 1962

INVENTOR
BUFORD R. EVERETT

BY Charles H. Redman ATTY.

INVENTOR
BUFORD R. EVERETT

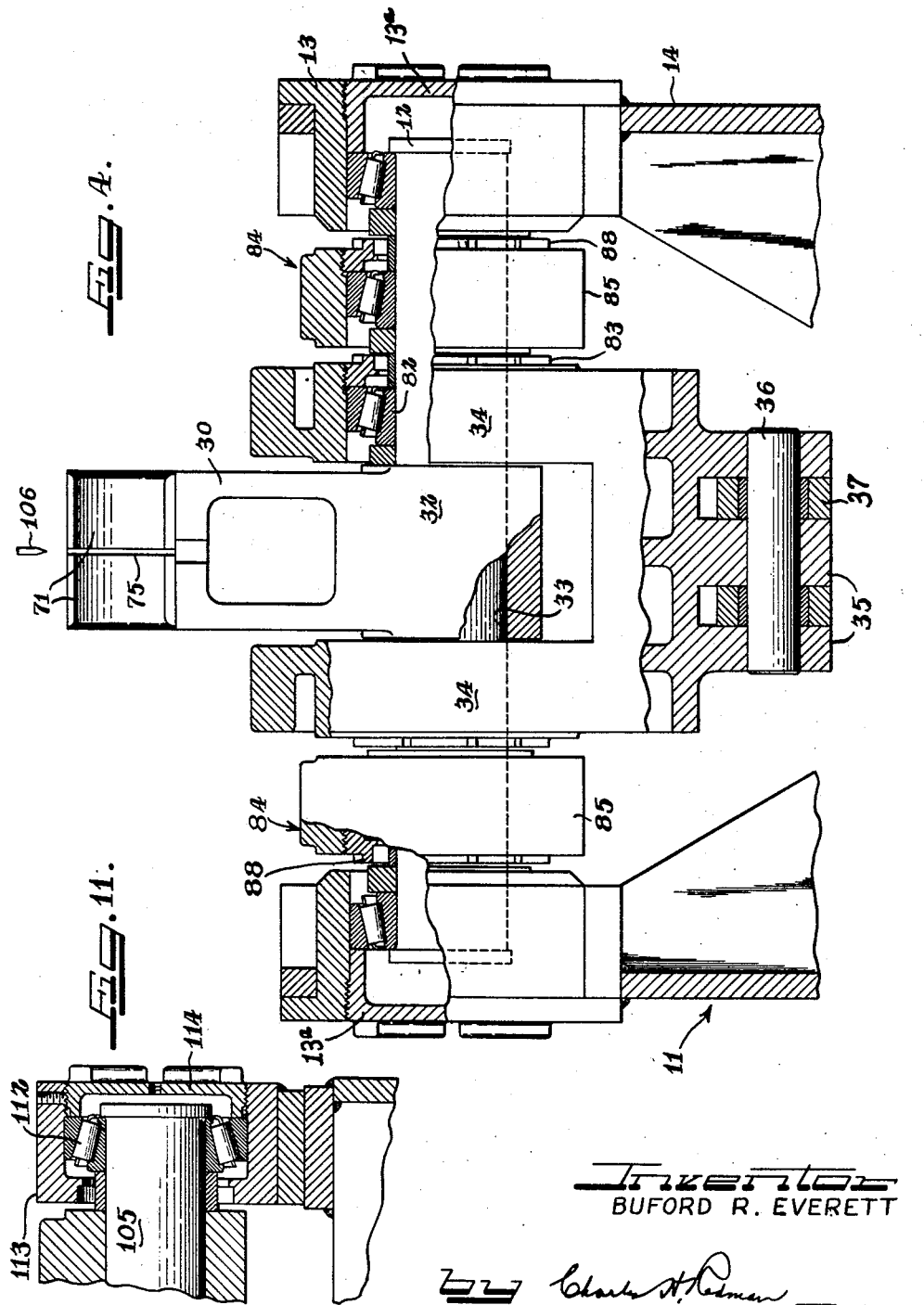

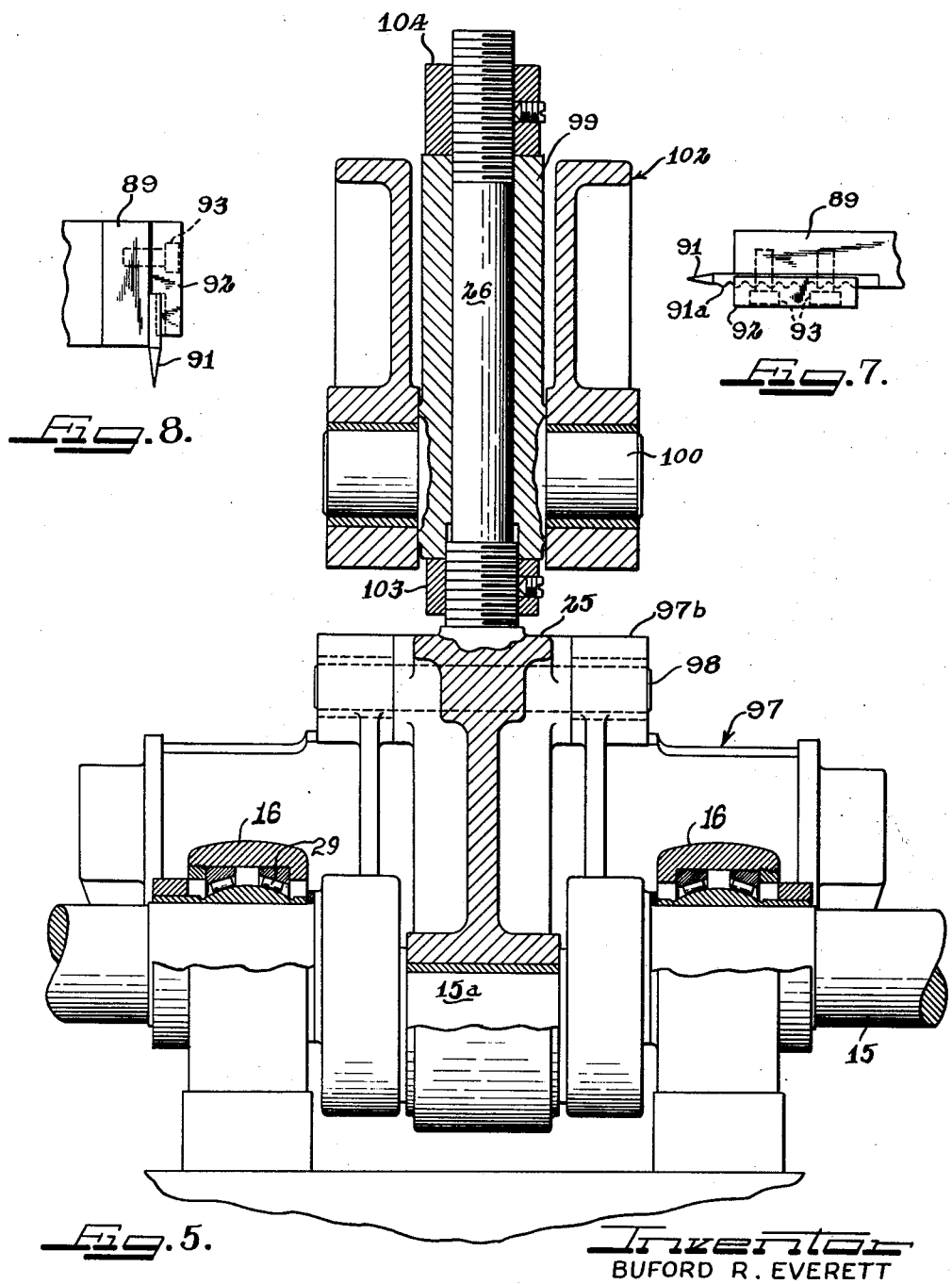

United States Patent Office 3,143,018
Patented Aug. 4, 1964

3,143,018
TUBE CUTTING APPARATUS
Buford R. Everett, Geneva, Ill., assignor to Pines Engineering Co., Inc., Aurora, Ill., a corporation of Illinois
Filed Feb. 20, 1962, Ser. No. 174,488
13 Claims. (Cl. 83—214)

The present invention relates to improvements in machines for severing tubes or like workpieces. More particularly, it is concerned with the novel construction and assembly of the mechanism mounting the holding clamp dies and cutting tools all of which are ruggedly constructed and may be adjusted within structural limits to accommodate workpieces of different diameters.

The present construction embodies improvements over the tube severing machine disclosed in the Fred Grieder Patent No. 2,572,137, issued October 23, 1951, and it differs therefrom in many respects, particularly in the mounting of both clamp elements for movement into and out of clamping position about a common axis and wherein the movement of said elements is made uniform and alike through a novel linkage assembly and common drive mechanism therefor. The present structure also includes a novel assemblage wherein both cutter blade mechanisms of the apparatus have a common drive shaft which functions to insure proper sequential operation of said cutter mechanisms. Further, said mechanisms are mounted in such a manner as to permit being adjusted axially relative to the clamp elements and to each other.

The cutting blades carried by said cutter mechanisms are characterized by being ruggedly constructed and so mounted as to be adjustably secured in place. This affords a structure wherein the cutting blades may be repeatedly sharpened and returned to predetermined cutting positions in the assembly.

It is, therefore, an object of this invention to provide a ruggedly constructed severing machine of the character described.

Another object is to provide novel means for mounting cutting blades securely in any position of length adjustment.

Another object of the invention is to provide a novel construction and assembly of workpiece clamp elements and common means for moving said elements about a common shaft into clamping and unclamping positions with respect to workpieces of various sizes.

Another object is to provide novel means to adjust the relative positions of a pair of clamp elements or jaws so as to adapt them to accommodate workpieces of different diameters and sizes.

Another object is to provide a novel severing machine assembly wherein the cutter mechanisms may be adjusted relative to each other and to the clamp dies, and be held firmly in such adjusted positions for operation without wobble or misalignment.

Another object is to provide a tube cutting machine of a character wherein the cutter mechanisms are actuated by common drive means so as to coordinate sequential operation of the mechanisms.

Another object of the invention is to provide novel means to adjust the cutting stroke of the vertical cutter mechanism relative to its drive means to adapt it for cutting operations on tubes or workpieces of different diameters and to coordinate its operation with the operation of the horizontal cutter mechanism.

Another object is to provide a rugged, heavy duty severing apparatus capable of universal adjustment and operable within minimum tolerances over long operational periods without malfunctioning or requiring adjustment except in instances dictated by a change in the size of the workpiece to be severed thereby.

The structure by means of which the above noted and other features and advantages of the invention are attained will be described in the following specification, taken in conjunction with the accompanying drawings, showing a preferred illustrative embodiment of the invention, in which:

FIG. 4 is an enlarged vertical transverse sectional view taken substantially on line 4—4 of FIG. 2, showing parts in elevation;

FIG. 5 is an enlarged vertical transverse sectional view taken on line 5—5 of FIG. 2, showing parts in elevation;

FIG. 6 is an enlarged horizontal plan view of the clamp dies and the mounting thereof as viewed on line 6—6 of FIG. 2;

FIGS. 7 and 8 are plan and end views, respectively, on an enlarged scale, of the horizontal cutting blade and its mounting;

FIG. 11 is a sectional detail view on an enlarged scale, taken substantially on line 11—11 of FIG. 1.

Figure 1:
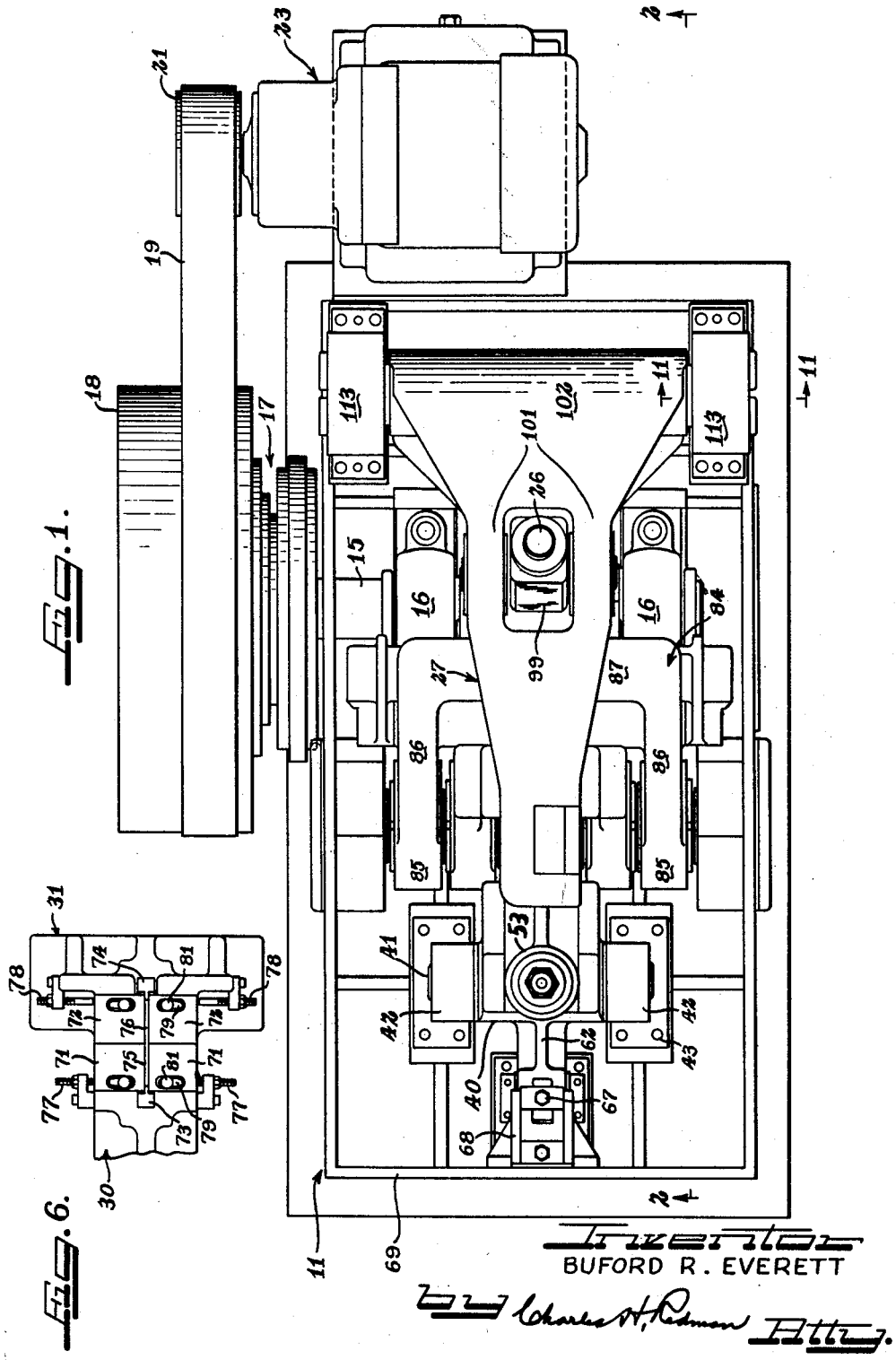
FIG. 1 is a top plan view of a tube severing apparatus embodying the features of the invention.

Referring to the accompanying drawings which disclose an exemplary embodiment of the invention, the severing machine elements are supported on and within a substantially rectangular frame or housing, generally indicated at 11, and it includes, generally, a transverse shaft 12 journalled at its ends in bearing 13 supported by side walls 14 of housing 11. This shaft affords an axial mounting for a pair of clamp elements and a horizontal cutter assembly, all to be described presently in detail. Frame 11 also mounts a crank-shaft 15 which is disposed parallel to shaft 12 and journalled for free rotation in pillow blocks 16 and has one end extended outwardly beyond one side wall 14 of said frame (FIG. 4). The shaft 15 mounts a combination one revolution clutch and brake assembly 17 and a pulley or flywheel 18, the latter being mounted for free rotation on said shaft. A belt 19, trained over said flywheel 18, provides a drive connection for said crank shaft 15 through a pulley 21 on the shaft 22 of a motor and gear housing combination 23 supported on a mounting 24 on one end of frame 11. As is well understood, the clutch and brake assembly 17 funtcions, during motor operation, to cause crank-shaft 15 to make one complete revolution each time the clutch is engaged, through operation of controls common to such devices.

In use, the machine is intended to cut pre-determined lengths of tubing from stock pieces of various diameters and wall thicknesses. This is accomplished by initially gripping the tubing tightly between a pair of movable clamp dies which are preadjusted to adapt them to clamping tubing of different diameters and in positions to be acted upon properly by associated cutting devices.

After a length of tubing is clamped firmly between the clamp dies it is subjected to the action of a horizontally reciprocal cutting blade which cuts a tangential groove in the uppermost peripheral segment of the wall thereof whereupon a substantially vertically reciprocable cutting blade is actuated to completely sever the tubing. The clamp dies are then released and the severed piece removed and the stock piece of tubing is repositioned manually or automatically for a succeeding severing operation. It should be quite evident that it is necessary, in order to attain satisfactory operation, that the clamp dies and cutting blades must be actuated in timed sequence and that, because of the close tolerances in which the various elements operate, any maladjustment or misalignment of any of the parts could result in serious damage to the machine and injury to the operator. The present apparatus is therefore provided with a novel arrangement of journals and bearings each adapted for adjustment in the direction of the axis of its respective shaft so as to facilitate positioning and proper alignment of the various parts.

Figure 2:
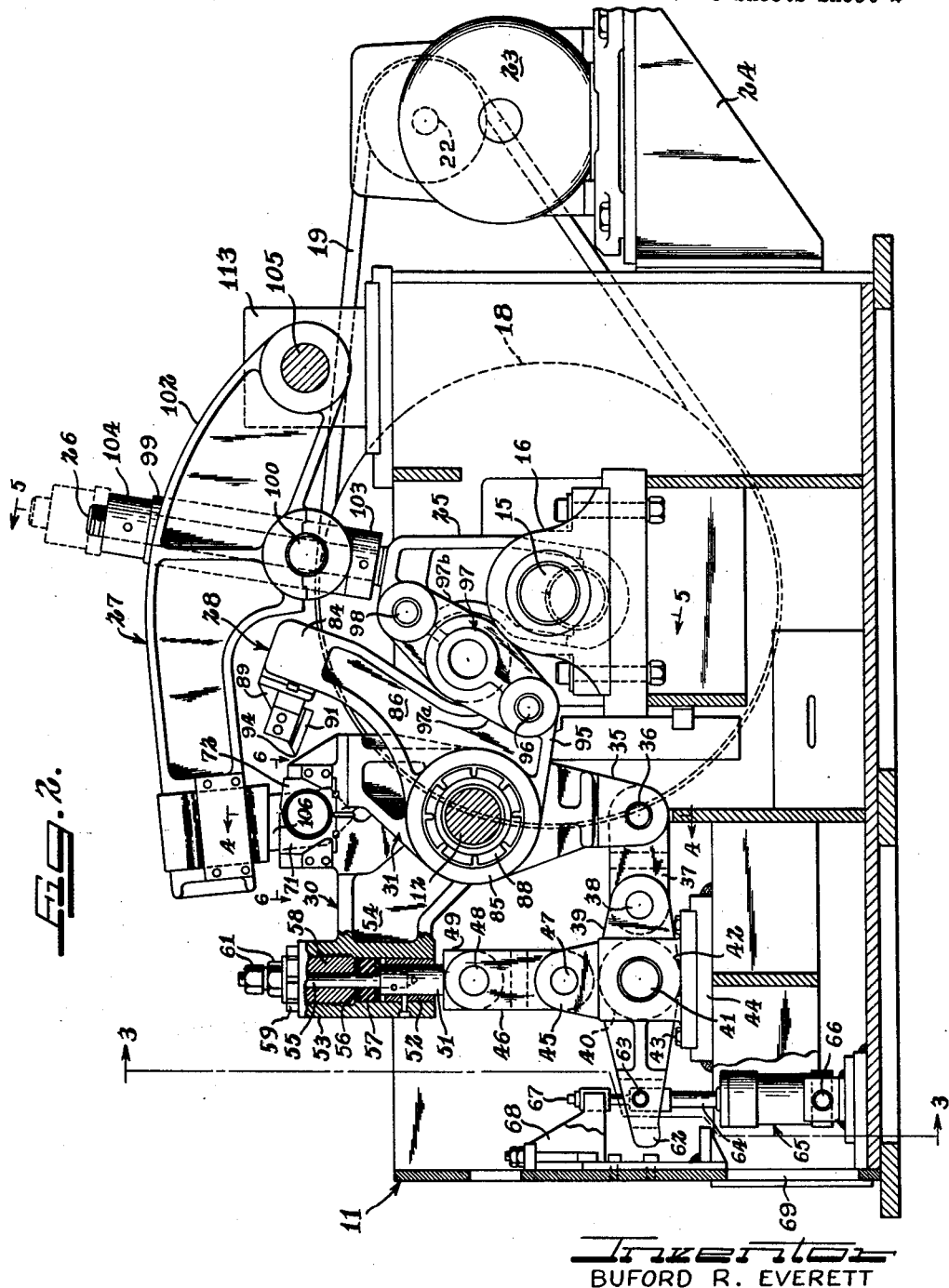
FIG. 2 is a vertical sectional view taken substantially on line 2—2 of FIG. 1, and showing the clamp die assembly adjusting means in vertical section.

Referring particularly to the FIGS. 1, 2 and 5 disclosures, the crank-shaft 15, journalled for free rotation in pillow blocks 16, has its eccentric or crank portion 15a mount the lower end of a pitman 25 that preferably comprises a casting having a rod-like extension 26 integral therewith and extending upwardly beyond the free end thereof. This pitman and its rod-like extension functions in a manner to be explained presently to actuate a vertical cutting element assembly, generally indicated at 27, and a horizontal cutting element assembly generally indicated at 28. The pillow blocks 16 house taper roller bearings 29 (FIG. 5) which afford minimum friction resistance to crank-shaft rotation.

The transverse shaft 12, which is journalled for free rotation at its ends in bearings 13, to be described in detail presently, provides an axial mounting for a pair of clamp-die carrying arms 30–31. Referring particularly to the FIGS. 1 to 4 disclosure, the arm 30 has a bearing boss 32 at its lower end having an axial bore 33 through which said shaft 12 extends for free rotation. The other arm 31 is bifurcated between its ends to straddle the boss 32 and its laterally spaced bearing bosses 34 are journalled on said shaft 12, one on each side of boss 32. The bosses 34 have common, depending and axially spaced lugs 35 suitably apertured to receive a pin 36 that connects one end of an H-link 37 thereto pivotally. The other end of said H-link 37 is connected, as by pin 38, to a set of spaced ears 39 formed integral with and extending from one side face of a rocker 40 journalled for free rotation on a laterally extending trunnion 41 journalled at its ends in bearing blocks 42 secured, as by bolts 43, to an integral part 44 of frame 11.

Rocker 40 also has a plurality of upstanding ears 45 (FIGS. 2, 3) between which the lower ends of a vertically extending H-shaped link 46 are nested and to which it is pivotally secured as by pin 47. The upper end of link 46 pivotally mounts, as by means of pin 48, the base 49 of a rod 51. As best shown in FIG. 2, said rod 51 has a sliding but snug fit within a bearing sleeve 52 mounted within a barrel 53 formed integral with the free end of a longitudinally extending vertical wall portion 54 of arm 30. The rod 51 has an extension 55 that extends upwardly through a pair of washers 56 having a body 57 of "nylon" or other tough wear-resistant cushion material interposed between them, and through an externally threaded bushing 58 that is threaded into the upper end of barrel 53. The projecting end of said bushing carries a lock nut 59, whereas the projecting end of extension 55 has nuts 61 threaded thereon.

The barrel-rod structure described in the preceding paragraph is designed to afford uniform adjustment of the relative positions of the arms 30–31, each of which mounts, in a manner to be described presently, a clamp die assembly provided for holding a workpiece in position to be severed. In order to accomplish uniform adjustment and consequent uniform range of movement of the clamp die assemblies, the distances between support shaft 12 and pins 36 and 48, and also between said pins and trunnion 41, are alike so as to form a geometric square. Any adjustment of rod 51 and its extension 55 relative to barrel 53 so as to alter the rest position of arm 30 and cause an increase or decrease in the range of movement of said arm during machine operation, will result in a corresponding alteration in the rest position and a like increase or decrease in the range of movement of arm 31. This assembly therefore adopts the arms 30–31 to accommodate clamp dies of various sizes, within the structural limitations of the apparatus, so as to accommodate workpieces of different diameters and still maintain the longitudinal axis of said workpiece in vertical alignment with support shaft 12. Such arm adjustment is accomplished by loosening the lock nuts 59 and 61, adjusting bushing 58 upwardly or downwardly, and then tightening said lock nuts to secure the bushing and stem 55 as so adjusted. This positioning of the bushing determines the relative positions and relationship of arm 30 and rod 51, the end of which is held in abutment with the bottom washer 56.

Figure 3:
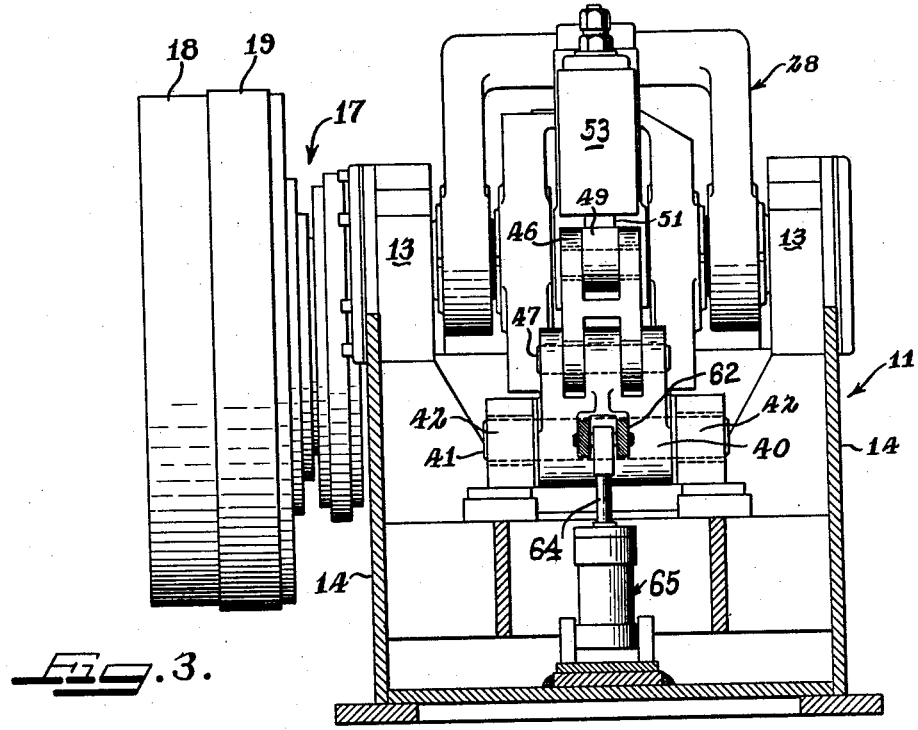
FIG. 3 is a vertical sectional view taken substantially on line 3—3 of FIG. 2.

As stated hereinabove, the arms 30–31 carry clamp dies which are moved into and out of clamping position by relative reciprocal rotation of arms 30–31 about shaft 12. Such movement is obtained through links 37 and 46 and oscillatable rotation of rocker 40. Referring particularly to FIGS. 1 to 3, said rocker 40 has a horizontally projecting arm 62 bifurcated at its free end and apertured to receive a pin 63 extending radially from a piston rod 64 forming a part of a cylinder-piston assembly 65, which is pivotally mounted as at 66, to the frame structure 11. Said piston-cylinder assembly is connected with a suitable source of hydraulic pressure and is operable to oscillatably rotate rocker 40 about its axis 41 for opening and closing the clamp dies carried by arms 30–31. Upward movement of piston rod 64 is limited by an adjustable stop 67 mounted in a bracket 68 supported for vertical adjustment on the end wall 69 of frame 11.

As noted, the oscillatably rotatable arms 30–31 mount clamp dies 71, 72, respectively. As best shown in FIG. 6, these dies are each made in two halves which are held spaced apart, as by spacers 73, 74, respectively, so as to provide slots 75, 76, respectively, into which cutting blades to be described presently are carried. The halves of die 71 are held firmly in place and against spacer 73 by set screws 77 that are brought to bear against the outside end faces of the respective halves. Similarily, set screws 78 function to hold the halves of die 72 in place and each die half has a slotted aperture 79 to receive a tightening bolt 81 that secures them firmly to the respective arm 30 or 31.

As will be understood better as the description proceeds, it is essential that die slots 75, 76, initially aligned by means of the respective screws 77, 78, remain in true alignment at all times notwithstanding wear on the bearings mounting the clamp die arms 30, 31. Accordingly, the bearing bosses 34 on arm 31 are journalled on tapered roller bearing raceway assemblies 82 (FIG. 4) and each boss 34 is internally threaded at its outwardly disposed end to receive an adjustable collar 83 which may be rotated in a direction to impart relative axial shifting of the bosses and bearing raceways so as to shift die arm 31 relative to die arm 30 and in a direction necessary to compensate for any looseness that may develop in the mounting.

As described hereinabove, the tube severing mechanism includes a horizontal cutting element assembly 28 and a vertical cutting element assembly 27. The horizontal cutting element assembly, best shown in FIGS. 1, 2 and 4, includes a substantially U-shaped frame 84 having bearing bosses 85 on the terminal ends of its side portions 86 which are journalled for free rotation on shaft 12. Antifriction tapered roller bearings 87 are mounted in said bearing bosses 85. The frame 84 is adjustable axially for wear compensation by means of collars 88 (FIG. 4) that are threaded one in each boss and which coact with the respective bearing raceways.

The upper or bridge portion of said frame 84 carries a mounting block 89 (FIG. 2) having one side face against which the back face of a cutter blade 91 is seated. Referring particularly to FIGS. 7 and 8, it will be noted that the opposite face of said blade is formed with vertical undulations 91a that are matched by like undulations on the opposed face of a clamp plate 92 secured to mounting block 89 as by screws 93. The cutting blade 91 has its cutting edge terminate in a point 94 (FIG. 1) and said edge is positioned with respect to the clamp dies 71 and 72 in such a manner that the blade enters the die slots 75, 76, during machine operation. The blade is subjected to wear and it may be sharpened repeatedly and repositioned on mounting block 89 in a manner to locate its cutting edge in the required plane for performing the cutting operation it is intended to perform.

In operation, the horizontal cutting assembly 28 is adapted to be actuated in synchronism with the operation of pitman 25 constituting a part of the vertical cutter assembly 27. To this end, each side portion 86 of the U-shaped frame 84 (FIG. 2) has a bearing boss 95 to which is pivoted, as by pins 96, one of each of a pair of arms 97a of an H-shaped link 97, the other pair of arms 97b of which are pivotally connected, as by pin 98, to the pitman 25.

As previously noted hereinabove, the pitman 25 is reciprocated in a generally vertical direction during rotation of crankshaft 15. The rod 26 on the end of said pitman projects through a sleeve 99 that is journalled at its lower end, as at 100, to the spaced side walls 101 of a beam 102. A pair of collars 103, 104, mounted on said rod 26 affords axial adjustment of the sleeve 99 relative to pitman 25. As perhaps best shown in FIGS. 1 and 2, the beam 102 is mounted at one end on a horizontal bearing shaft 105 and its other or free end extends above clamp dies 71, 72, and carries a vertical cutter blade 106. During machine operation, the beam 102 is oscillatably rotated about its axis 105, through operation of pitman 25, to carry the cutter blade 106 toward and away from clamp dies 71 and 72.

Figures 9, 10:
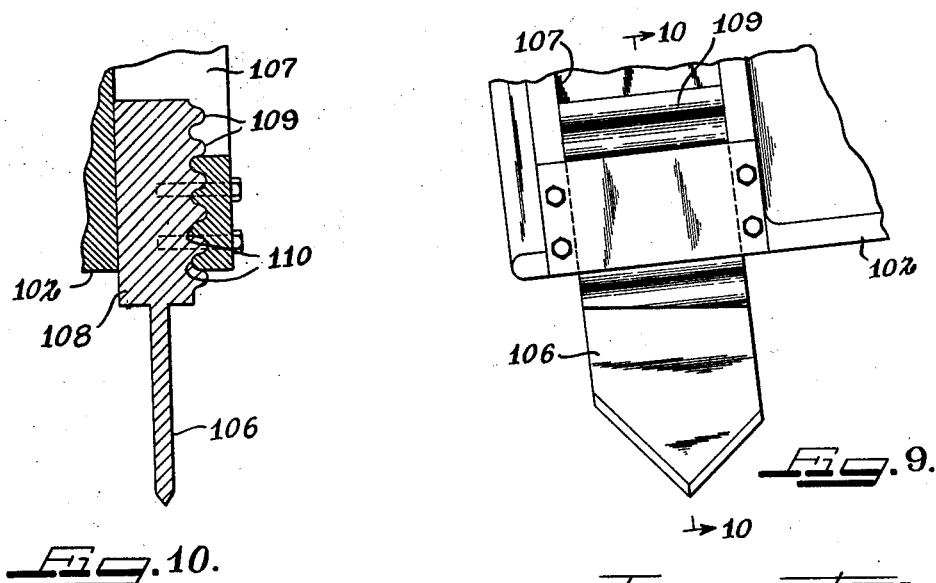
FIG. 9 is an enlarged elevational view of the vertical cutting blade and its mounting.
FIG. 10 is a sectional view taken on line 10—10 of FIG. 9.

The cutter blade 106 and its mounting is best illustrated in FIGS. 9 and 10. As shown, the end of beam 102 has a vertical guideway 107 on one face thereof in which the thick base 108 of blade 106 is slidably mounted. The outwardly disposed face of said base 108 has lateral undulations 109 that coact with undulations 110 on the inside face of a removable clamp strap 111 so as to retain the blade in any position of vertical adjustment relative to beam 102. Such adjustment is required to compensate for wear and repeated sharpening of the blade and to position the point thereof at the most effective position for operation.

Because the blade 106 also operates to enter the clamp die slots 75, 76 during a cutting operation, it must be in true vertical alignment at all times. In order to compensate for wear and to insure such alignment, the bearing shaft 105 (best shown in FIG. 11) has its ends journalled in tapered roller bearings 112, housed in bearing blocks 113, each of which has a bearing thrust ring or cap 114 threaded therein and adjustable to shift the bearing shaft assembly axially in either direction. Similarly, the shaft 12 may be adjusted axially by adjustment of thrust rings or caps 13a in bearings 13.

During machine operation, the clamp dies 71, 72, are initially open to receive a workpiece and the cutter blades are in retracted positions. The piston-cylinder assembly 65 then is operated to clamp the dies firmly about the workpiece to hold it in position. The motor 23 being in operation, the clutch mechanism 17 is actuated to cause crank-shaft 15 to make one complete revolution in a clockwise direction as viewed in FIG. 2. During such rotation, initial upward movement of the pitman, from an intermediate position of rest, operates through link 97 to carry the horizontal cutter blade 91 across the top portion of the workpiece so as to cut a tangential groove therein. As the crankshaft rotation continues, the horizontal cutter blade is withdrawn from the workpiece and the vertical cutter blade immediately moves downwardly through the horizontal groove in the workpiece and completely through the workpiece to sever a piece of predetermined length. Since movement of both cutter blades is derived from the same shaft it is impossible for these two mechanisms to get out of properly timed relation.

As many possible embodiments may be made in the invention, and as many changes might be made in the embodiment above set forth, it is to be understood that all matters hereinbefore set forth or shown in the accompanying drawings are to be interpreted as illustrative and not in a limiting sense.

What I claim and desire to secure by Letters Patent of the United States is:

1. A tube severing machine which comprises a clamp having movable clamp dies and adapted to clamp tube stock in a fixed position, means common to both of said clamp dies for moving them in unison into and out of clamping position, means to adjust said moving means to adapt said clamping dies to accommodate tube stock of different diameters, said clamp dies each having a slot extending through it crosswise of the stock, a cutter blade normally disposed on one side of said clamp dies and movable about a fixed axis across the top of said slot and adapted to cut a groove in the stock approximately tangential to the inner diameter thereof, a second cutter blade normally disposed above said clamp dies and movable through an arc and adaptable to completely sever the stock by penetrating it at the point where it is grooved by the first cutter blade, drive means including a crank shaft, means connecting said crank shaft to means common to both of said cutter blades for driving the cutter blades in sequence, and means to adjust the cutter blades relative to their mountings to compensate for size reduction resulting from sharpening said blades.

2. A tube severing machine which comprises a clamp having movable clamp dies and adapted to clamp tube stock in a fixed position, means common to both of said clamp dies for moving them in unison about a common axis into and out of clamping position, means to adjust said moving means to adapt said clamp dies to accommodate tube stock of different diameters, said clamp dies each having a slot extending through it crosswise of the stock, means to adjust the clamp dies to align the slots, a cutter blade normally disposed on one side of said clamp dies and movable through an arc about a fixed axis across the top of said slot and adapted to cut a groove in the stock approximately tangential to the inner diameter thereof, a second cutter blade normally disposed above said clamp dies and movable through an arc and adaptable to completely sever the stock by penetrating it at the point where it is grooved by the first cutter blade, and means to adjust the cutter blades in the direction of the axis of the tube stock so as to align the blades with one another and with said slots.

3. A tube severing machine which comprises a clamp having movable clamp dies and adapted to clamp tube stock in a fixed position, means common to both of said clamp dies for moving them in unison into and out of clamping position, means to adjust said moving means to adapt said clamp dies to accommodate tube stock of different diameters, said clamp dies each having a slot extending through it crosswise of the stock, means to adjust the clamp dies to align said slots, a cutter blade normally disposed on one side of said clamp dies and movable through an arc about a fixed axis across the top of said slot and adapted to cut a groove in the stock approximately tangential to the inner diameter thereof, and a second cutter blade normally disposed above said clamp dies and movable through an arc and adaptable to completely sever the stock by penetrating it at the point where it is grooved by the first cutter blade.

4. In a cut-off machine, movable clamp dies adapted to clamp a workpiece during a severing action, arms mounting said clamp dies, a common shaft mounting said arms for oscillatable movement to carry the clamp dies into and out of clamping positions, means operable to move said arms, common linkage connecting said operable means and the arms to effect like movement to each arm so as to locate the clamp dies when in clamping condition in a predetermined position to hold a workpiece clamped therebetween in a predetermined position regardless of the diameter of said workpiece, the dies having a slot therethrough, a cutter blade mounted for movement in a direction to cut a tangential groove in the workpiece, a second cutter blade mounted for movement in a direction to enter the groove at an angle substantially perpendicular thereto and pass through the slots in the clamp dies and sever the workpiece, a power source, a crank-shaft, a clutch connected to the crank-shaft and adapted to engage the power source, means connected to the crank-shaft for actuating the second cutter blade, and means connected to said connected means for actuating the first cutter blade.

5. In a cut-off machine, movable clamp dies adapted to clamp a workpiece during a severing action, arms mounting said clamp dies, a common shaft mounting said arms for oscillatable movement to carry the clamp dies into and out of clamping positions, means operable to move said arms, common linkage connecting said operable means and the arms to effect like movement to each arm so as to locate the clamp dies when in clamping condition in a predetermined position to hold a workpiece clamped therebetween in a predetermined position regardless of the diameter of said workpiece, the dies having a slot therethrough, a cutter blade mounted for movement in a direction to cut a tangential groove in the workpiece, and a second cutter blade mounted for movement in a direction to enter the groove at an angle substantially perpendicular thereto and pass through the slots in the clamp dies and sever the workpiece, said cutter blades and clamp dies being adjustable relative to each other in the direction of the axis of the workpiece.

6. An automatic cut-off machine which comprises movable clamp dies for clamping a workpiece during a severing action, said dies having a slot therethrough, cutter blades operable to enter said slot and sever the workpiece, arms mounting said clamp dies for oscillatable rotation about a common axis, said arms being axially adjustable relative to each other so as to align the slots in the clamp dies, means operable to oscillate said arms, and means to adjust the relative positions of said clamp dies when in clamping positions.

7. In a tube cut-off machine, an arm mounted for free rotation about an axis, a clamp die carried by said arm, a yoke straddling said arm and mounted for free rotation on said axis, a clamp die carried by said yoke and adapted to cooperate with the first named clamp die to clamp a workpiece in position to be severed, means to oscillatably rotate said arm and yoke to carry the clamp dies into and out of clamping position, means to adjust the yoke relative to the arm axially to align the clamp dies crosswise of the axis of the workpiece, a slot in each clamp die extending crosswise of the axis of the workpiece, means to adjust the clamp dies relative to their mounting to align the slots, cutter blades movable into and out of said slots to sever the workpiece, mounting means for said cutter blades including oscillatably rotatable arms one of which is journalled on the axis of said clamp die arms, and common drive means for said cutter blade arms.

8. In a tube cut-off machine, an arm mounted for free rotation about an axis, a clamp die carried by said arm, a yoke straddling said arm and mounted for free rotation on said axis, a clamp die carried by said yoke and adapted to cooperate with the first named clamp die to clamp a workpiece in position to be severed, means to oscillatably rotate said arm and yoke to carry the clamp dies into and out of clamping position, means to adjust the yoke relative to the arm axially to align the clamp dies crosswise of the axis of the workpiece, a slot in each clamp die extending crosswise of the axis of the workpiece, means to adjust the clamp dies relative to their mounting to align the slots, cutter blades movable into and out of said slots, mounting means for said cutter blades including oscillatably rotatable arms one of which is journalled on the axis of the clamp die arms, a crank-shaft, drive means for said crank-shaft, a pitman connecting said crank-shaft with the other of said cutter blade arms, and link means connecting said pitman with the first cutter blade arm for imparting synchronous movement to said cutter blades.

9. In a tube cut-off machine, a shaft, an arm mounted for free rotation on said shaft, a clamp die carried by said arm, a yoke straddling said arm and mounted for free rotation on said shaft, a clamp die carried by said yoke and adapted to cooperate with the first named clamp die to clamp a workpiece in position to be severed, means to oscillatably rotate said arm and yoke to carry the clamp dies into and out of clamping positions, a slot in each clamp die extending crosswise of the axis of the workpiece, cutter blades movable into and out of said slots to sever the workpiece, a pair of arms each mounting a cutter blade, a crank-shaft, drive means for said crank-shaft, a pitman connecting said crank-shaft with one of said cutter blade arms, and link means connecting said pitman with the other of said cutter blade arms for imparting synchronous movement to said cutter blades.

10. In a tube cut-off machine, an arm mounted for free rotation about an axis, a clamp die carried by said arm, a yoke straddling said arm and mounted for free rotation on said axis, a clamp die carried by said yoke and adapted to cooperate with the first named clamp die to clamp a workpiece in position to be severed, means to oscillatably rotate said arm and yoke to carry the clamp dies into and out of clamping position, a slot in each clamp die extending crosswise of the axis of the workpiece, cutter blades movable into and out of said slots to sever the workpiece, mounting means for said cutter blades including oscillatably rotatable arms, one of which is journalled on the axis of said clamp die arms, a crank-shaft, drive means for said crank-shaft, and means connecting said crank-shaft with said cutter blade arms.

11. In a cut-off machine, movable clamp dies adapted to clamp a workpiece during a severing action, said clamp dies each having a slot therethrough, means to align said slots, a cutter blade mounted for movement in a direction crosswise of the workpiece so as to enter the slots and cut a tangential groove in the workpiece, a second cutter blade mounted for movement in a direction downwardly so as to enter the groove at an angle substantially perpendicular thereto and pass through the slots in the clamp dies and sever the workpiece, a power source, an eccentric, a clutch connected to the eccentric and adapted to engage the power source, means connected to the eccentric for actuating the second cutter blade, and means connected to said connected means for actuating the first cutter blade.

12. In an automatic cut-off machine, movable clamp dies adapted to clamp a workpiece during a severing action, said clamp dies each having a slot therethrough, a cutter blade mounted for movement in a direction crosswise of the workpiece so as to cut a tangential groove in the workpiece, a second cutter blade mounted for movement in a downward direction so as to enter the groove at an angle substantially perpendicular thereto and pass through the slots in the clamp dies and sever the workpiece, a power source, a crank-shaft, a clutch connected to the crank-shaft and adapted to engage the power source, means connected to the crank-shaft for actuating the second cutter blade, and means connected to said connected means for actuating the first cutter blade.

13. In a cut-off machine, movable clamp dies adapted to clamp a workpiece during a severing action, said clamp dies each having a slot therethrough, means to align said slots in a direction crosswise of the workpiece, a cutter blade mounted for movement into said slots so as to cut a tangential groove in the workpiece, a second cutter blade mounted for movement in a direction to enter the groove at an angle substantially perpendicular thereto and pass through said slots and sever the workpiece, means to adjust said cutter blades to align them with said slots, an eccentric, means to rotate said eccentric, and means connected to the eccentric for actuating said cutter blades in timed sequence.

References Cited in the file of this patent

UNITED STATES PATENTS

| | | | |
|---|---|---|---|
| Re. 22,114 | Borzym | June 16, | 1942 |
| 860,554 | Meyers | July 16, | 1907 |
| 2,071,055 | Aff | Feb. 16, | 1937 |
| 2,484,601 | Abbey | Oct. 11, | 1949 |
| 2,572,137 | Grieder | Oct. 23, | 1951 |
| 2,908,300 | Hahn | Oct. 13, | 1959 |
| 2,969,817 | Zabich | Jan. 31, | 1961 |
| 3,046,825 | Thompson | July 31, | 1962 |